United States Patent
Butterfield et al.

(10) Patent No.: US 6,505,861 B2
(45) Date of Patent: Jan. 14, 2003

(54) ROTATABLE SWIVEL ELBOW

(75) Inventors: Eric John Butterfield, Louisville, KY (US); Peter C. Goodier, Goshen, KY (US)

(73) Assignee: Syltone Industries, LLC., Louisville, KY (US)

( * ) Notice: Subject to any disclaimer, the term of this patent is extended or adjusted under 35 U.S.C. 154(b) by 0 days.

(21) Appl. No.: 09/892,341

(22) Filed: Jun. 27, 2001

(65) Prior Publication Data

US 2002/0014769 A1 Feb. 7, 2002

Related U.S. Application Data

(60) Provisional application No. 60/221,930, filed on Jul. 31, 2000.

(51) Int. Cl.[7] .................................................. F16L 27/00
(52) U.S. Cl. ..................... 285/184; 285/179; 285/181; 285/272; 285/275; 285/276; 285/277; 285/278; 285/312; 285/320
(58) Field of Search ................................. 285/181, 179, 285/272, 312, 320, 275, 276, 277, 278

(56) References Cited

U.S. PATENT DOCUMENTS

| | | | | |
|---|---|---|---|---|
| 810,315 A | * | 1/1906 | Wiggs, Jr. ..................... 285/61 |
| 929,953 A | * | 8/1909 | Johnston ...................... 285/275 |
| 1,119,774 A | * | 12/1914 | Black ........................... 285/61 |
| 1,402,912 A | * | 1/1922 | Thompson ...................... 285/1 |
| 1,737,793 A | * | 12/1929 | Harris .......................... 285/61 |
| 1,865,462 A | * | 7/1932 | Etnyre ......................... 285/311 |
| 2,522,127 A | * | 9/1950 | Krapp .......................... 285/312 |
| 2,525,037 A | * | 10/1950 | Krapp .......................... 285/312 |
| 2,641,490 A | * | 6/1953 | Krapp .......................... 285/309 |
| 2,746,773 A | * | 5/1956 | Bily ............................ 285/117 |
| 3,199,898 A | * | 8/1965 | Faccou ......................... 285/41 |
| 3,432,191 A | * | 3/1969 | Ludeman ....................... 285/311 |
| 3,785,413 A | * | 1/1974 | Taverner et al. ............... 141/84 |
| 3,881,510 A | * | 5/1975 | Hansel ......................... 137/590 |
| 4,457,349 A | * | 7/1984 | Vazin .......................... 141/86 |
| 4,575,130 A | * | 3/1986 | Pemberton et al. .............. 285/38 |
| 4,770,317 A | * | 9/1988 | Podgers et al. ................ 220/86 R |
| 5,042,850 A | * | 8/1991 | Culler ......................... 285/320 |
| 5,535,984 A | * | 7/1996 | Anderson et al. .............. 251/149.9 |
| 5,664,951 A | * | 9/1997 | Clary et al. ................... 439/92 |
| 5,791,694 A | * | 8/1998 | Fahl et al. .................... 285/38 |
| 5,873,387 A | * | 2/1999 | Weber et al. ................... 137/615 |

* cited by examiner

Primary Examiner—Robert J. Sandy
Assistant Examiner—Carlos Lugo
(74) Attorney, Agent, or Firm—Dougherty & Clements LLP

(57) ABSTRACT

The invention relates to a swivel adapter-coupler that is to be positioned between a conventional fixed drop elbow on the end of a hose of a tanker truck for an underground storage tank. The other end of the swivel adapter-coupler attaches to the pipe adapter (either the fill pipe or the vapor pipe) of the underground storage tank, in the conventional quick-connect type connection. The swivel adapter-coupler permits loops and kinks in the hose to be removed by rotating the swivel adapter-coupler in the proper direction. Likewise, the invention relates to a rotatable drop elbow to replace the conventional fixed drop elbow at the end of a hose on a tanker truck. The rotatable drop elbow eliminates loops and kinks in the hose by merely rotating the drop elbow in the proper direction.

8 Claims, 5 Drawing Sheets

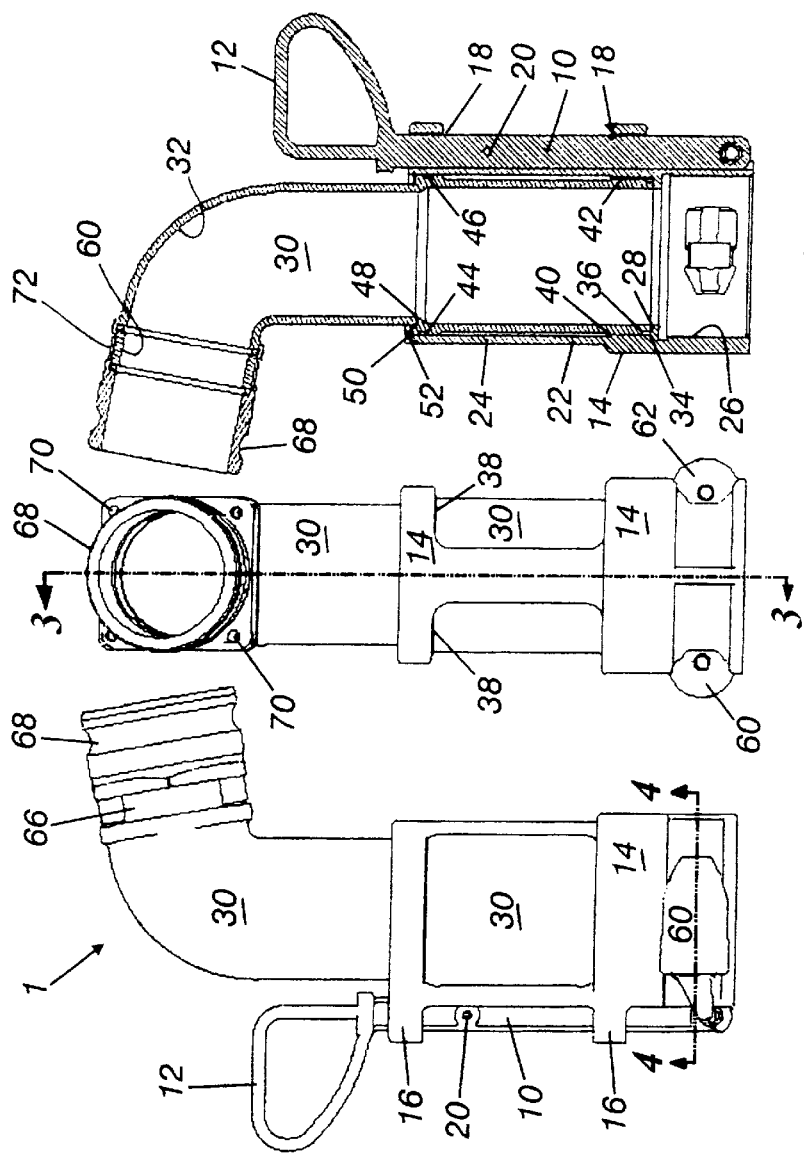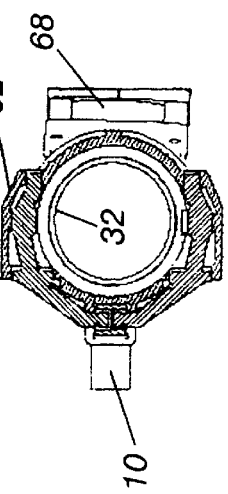

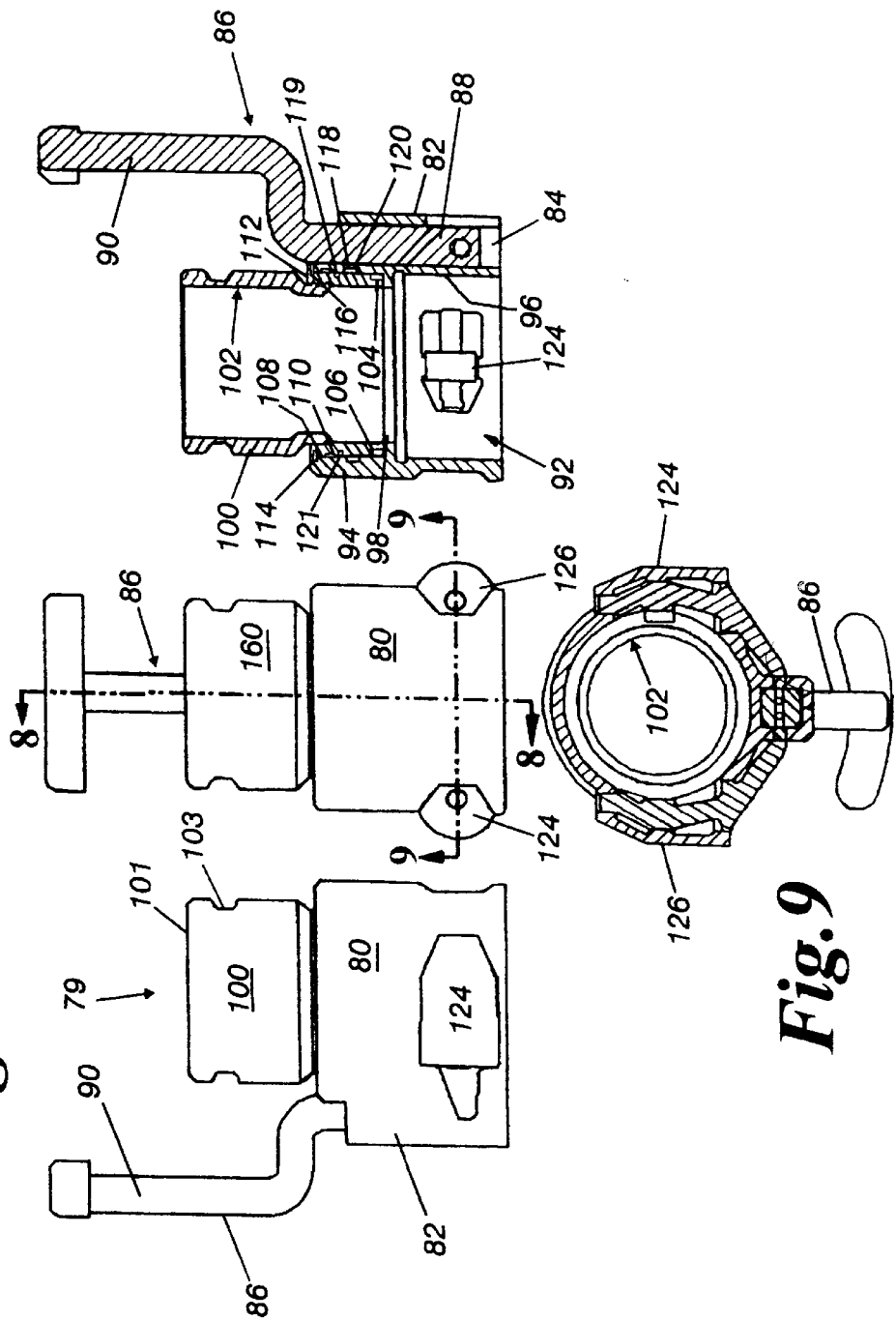

ROTATABLE SWIVEL ELBOW

This application claims the benefit of the filing date of Jul. 31, 2000, through its parent provisional patent application having number 60/221,930 of the same title and inventorship.

1. Field of the Invention

The present invention relates to the transfer of fuel from a fuel tanker truck to an underground storage tank (UST) and the transfer of vapor from the UST to the tanker truck. In particular, the invention relates to attaching the hose from the tanker truck to the UST in such a manner that it does not loosen the fill pipe adapter or fill pipe (or the vapor pipe) on the UST. More specifically, the invention concerns either: 1) a rotatable, swivel drop elbow, which permits the drop elbow to rotate about the axis of the fill pipe or vapor pipe of the UST, or 2) a swivel adapter for use with a conventional fixed drop elbow, whereby the adapter rotates about the axis of the fill pipe or vapor pipe. Both devices do not transfer significant torque from the hose to the fill pipe adapter or the vapor pipe, thus insuring that the transfer of fuel occurs without leakage of vapor or liquid into the environment.

2. Prior Art

Conventional UST's are filled by means of a fill pipe that projects upwardly from the tank and terminates with a fill pipe adapter, in a containment vessel designed to contain spilled fuel. The containment vessel has an opening covered by a manhole that provides access to the fill pipe and fill pipe adapter. The fill pipe adapter: 1) permits coupling with the drop elbow of a hose of a tanker truck thereby preventing any leakage into the environment, and; 2) prevents dirt and other bits of foreign matter from dropping into the UST through the fill pipe. Conventional UST's also have a vapor pipe so that as the fuel is dropped into the UST, the displaced vapor is transferred to the tanker truck, replacing the volume of dropped fuel.

U.S. Pat. No. 5,535,984 to Anderson et al discloses a tanker truck having a hose terminating in a fixed drop elbow. The elbow has a quick connect type action that permits connection to the fill pipe adapter of a fill pipe of a UST. The spirit of this invention lies with securing the elbow securely to the fill pipe so that no fuel is spilled when filling the UST.

Frequently, a hose on the tanker truck is extracted from the truck in such a way that it is not straight and has one or more loops and kinks, causing axial forces to be applied to the fixed drop elbow especially when fuel flows through the hose causing it to stiffen and straighten. Should the drop elbow be connected to the fill pipe adapter without straightening the hose and removing all loops and kinks, the fixed drop elbow transfers those axial forces to the fill pipe adapter. Because the fill pipe and its fill pipe adapter are fastened to one another or to the UST by screw threads, with time the summation of these axial forces, in the counter direction of rotation of the screw threads, causes the fill pipe and/or fill pipe adapter to loosen and vapors to escape the UST. In sever cases, the fill pipe adapter and/or fill pipe may even detach from the UST. On the other hand, if the summation of the axial forces is in the direction of rotation of the screw threads, the gasket material can be crushed, fail and likewise lead to escaping vapors or fuel spills.

In view of the problem described above, there is a need for an improved system that overcomes the problems set forth above and yet maintains the quick connect features now present on conventional drop elbows. Advantageously, there is a need for a drop elbow that prevents any significant torque forces from being transmitted to the fill pipe adapter and/or fill pipe. Most expediently, there is a need for a drop elbow that is adaptable to existing equipment, such that every UST fill pipe and/or fill pipe adapter does not need to be modified to prevent torque forces from transferring to the fill pipe adapter and/or its fill pipe. While the problems set forth above are stated with respect to the drop elbow, the same problem may also be present with respect to the vapor recovery hose running between the UST and the tanker truck.

SUMMARY OF THE INVENTION

The present invention will be described primarily in terms of the drop or fill pipe connection, but it is equally applicable to the hose running between the UST and the tanker truck for the recovery of vapors. The present invention relates to a drop elbow adapted to fluidly connect with the conventional female coupler of a hose from a tanker truck, on one end, and the fill pipe adapter or vapor pipe adapter of an underground storage tank on the other end. The drop elbow is rotatable and swivels 360 degrees with respect to the fill pipe, while remaining fluidly connected, thereby accommodating any kinks and loops in the hose, and correspondingly minimizing any torque forces which may be transferred to the fill pipe adapter and/or fill pipe. Moreover, the elbow of the present invention maintains a quick connect feature such that coupling the hose (having the drop elbow thereon) with the fill pipe adapter is simple, quick, and fluidly secure. Thus the rotatable drop elbow of the present invention is designed to replace the fixed drop elbow conventionally known.

In the broadest sense, the present invention concerns a rotatable, swivel drop elbow comprising a housing and an elbow tube, whereby the elbow tube can rotate 360 degrees relative to the housing while remaining fluidly connected. Additionally, the elbow has a cam and groove adapter that accepts a conventional female coupler on a hose of a tanker truck. Alternatively, the elbow can be secured to the hose by any conventional means such as by a simple hose clamp. Lastly, the housing includes a latch bar or other similar mechanism that is mechanically connected with one or more locking cams that permit the cam housing to securely and quickly fasten to the male fill pipe adapter or the vapor pipe of a UST.

The present invention also relates to the use of a swivel adapter-coupler for use with a conventional fixed drop elbow. The adapter-coupler is positioned between the non-rotatable, fixed drop elbow and the conventional fill pipe adapter. This swivel adapter-coupler converts the fixed drop elbow into a rotatable drop elbow while remaining fluidly connected.

In the broadest sense, the present invention also concerns a swivel adapter-coupler capable of rotating 360 degrees, comprising an adapter that accepts a conventional female coupler of a fixed drop elbow, and a coupler that securely and quickly couples to the male pipe adapter of a UST, while remaining fluidly connected.

BRIEF DESCRIPTION OF THE DRAWINGS

The drawings set forth herein are to aid in the understanding of the present invention and are not intended to limit the scope of the invention beyond that of any claims.

FIG. 1 is a side view of the rotatable, swivel drop elbow of the present invention.

FIG. 2 is a front view of the elbow of FIG. 1.

FIG. 3 is a cross-sectional side view along the axis of rotation of the elbow tube along line 3—3 of FIG. 2.

FIG. 4 is a cross-sectional view perpendicular to the axis of rotation along line 4—4 of FIG. 1.

FIG. 6 is a side view of the swivel adapter-coupler of the present invention.

FIG. 7 is a front view of the swivel adapter-coupler of FIG. 6.

FIG. 8 is a cross-sectional side view along the axis of rotation of the swivel adapter-coupler along line 8—8 of FIG. 7.

FIG. 9 is a cross-sectional view of the swivel adapter-coupler perpendicular to the axis of rotation along line 9—9 of FIG. 7.

DESCRIPTION OF THE EMBODIMENTS

Figure 5:
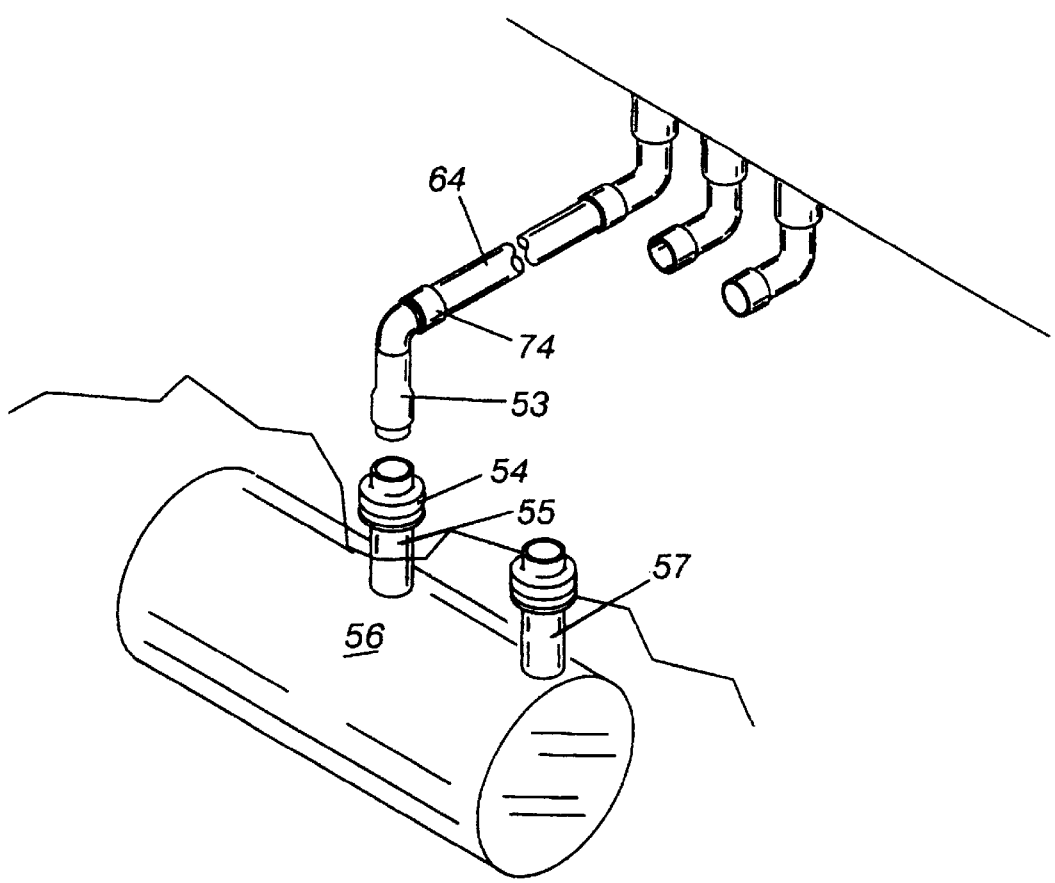
FIG. 5 is a schematic view of an UST, fill pipe, fill pipe adapter, drop elbow, and tanker truck hose fluidly connected with one another.

The components that assemble to make the rotatable drop elbow or the swivel adapter-coupler of the present invention may be made from plastic, composite materials, metals and the like, except for the gaskets, seals and O-rings, which are generally made from rubber, synthetic rubber, flexible plastic, cork, or other known sealing material. Suitable metal raw material may be any type of metal, however for explosion safety, metals that do not spark when struck are preferred. Those metals are aluminum, copper and copper alloys such as brass, tin, etc. all well known to those skilled in the art. Aluminum is the most preferred metal. Suitable plastics and composite materials are those strong enough for the intended use, and do not react with the various types of fuels.

FIG. 1 shows the rotatable drop elbow of the present invention generally indicated by reference numeral 1. The rotatable elbow 1 has a latch bar 10 including a loop handle 12 at one end thereof. The latch bar 10 can reciprocate along its longitudinal axis. The latch bar is mounted within the housing 14, by outwardly projecting portions 16, each projecting portion having a hole 18 bored through it, so that each hole aligns with one another to reciprocally contain the latch bar 10. The latch bar also has a roll pin 20 to limit its movement upwardly as viewed from FIG. 1. The upward movement is arrested when pin 20 contacts the bottom surface of the upper, outwardly projecting portion 16. The housing 14 has an inner cylindrical bore 22 having an upper portion 24, and a lower portion 26, separated from one another by a ledge 28, as viewed from FIG. 3. The ledge 28 is merely an integral part of housing 14, created by boring the upper and lower portions 24, 26 of a larger diameter. The upper portion 24 houses the elbow tube 30, which rotates with respect to the housing 14. As seen from both FIGS. 1 and 3, the elbow tube 30 extends beyond the height of the loop handle 12 so that it can rotate 360 degrees.

The elbow tube 30 is like a pipe and is hollow on its inside 32, as shown in FIG. 3. This allows fluid to flow through the inside 32 to the lower bore 26 in housing 14. The elbow tube 30 must be sealed with respect to the housing 14 so that no fluid leaks between these components. To seal these components, the outside lower surface of the elbow tube 30 contains an annular groove 34 for holding an O-ring 36. If desired, more than one sealing means may be employed to obtain a good seal between the housing 14 and the elbow tube 30.

As shown in FIGS. 1 and 2, the housing 14 is not a solid pipe-like component. Two semicircular, longitudinal openings 38 are in the upper portion 24 of the housing 14, thereby exposing the exterior side of the elbow tube 30. While these openings 38 are not necessary, they reduce the amount of friction between the housing and the elbow tube, upon rotation of the elbow tube. However, these openings 38, if provided, do require a second annular groove 40 on the exterior of the elbow tube 30, to contain dust shield 42, preferably of the grease type, to aid in the rotation of the elbow tube 30.

Approximately mid way of the elbow tube 30 when viewing FIG. 3, is another annular groove 44 in the exterior surface thereof, near the upper end of the housing 14, which contains a grease type bearing 46 to aid in the rotation of the elbow tube 30. Above bearing 46 is an annular recessed ledge 48 on the elbow tube 30. A flat retaining C-ring 50 whose outer periphery snuggly fits within an annular groove 52 on the inside surface of the upper end of housing 14, extends substantially around the elbow tube 30 and rests against the recessed ledge 48. The retaining C-ring 50 prevents the elbow tube from disengaging from the housing (i.e., it can not move upwardly along its longitudinal axis) and ledge 28 prevents the elbow tube from moving downwardly, so that it can only rotate or swivel, with no axial movement.

To secure the drop elbow 53 to the fill pipe adapter 54 (see FIG. 5) on fill pipe 55, or on the vapor pipe 57 of a UST 56, a quick connector is desirable. The quick connector apparatus of the drop elbow includes the latch bar 10. The bottom of the latch bar is mechanically affixed to a pair of locking cams 60, 62 as seen in FIGS. 1–4. The locking cams are conventionally known and are employed on the hose 64 of the tanker truck (not shown). The locking cams 60, 62 retract to release the elbow coupler from the fill pipe adapter 54 when the latch bar is pulled upwardly. Otherwise the latch bar 10 and the locking cams 60, 62 are pushed down to lock onto the mating male adapter 54. The details of the locking cams are not disclosed herein since they are conventional.

The upper end of the elbow tube 30 may optionally contain a sight glass 66 typically constructed of clear plastic, to allow the operator to determine if fuel is flowing through the elbow coupler from the hose. The sight glass 66 is secured between the elbow tube 30 and a male adapter 68 by bolts 70 as shown in FIG. 2. Spacers 72 (see FIG. 3) that are the length of the sight glass, are employed to prevent crushing the site glass when bolted to the elbow tube 30. The male adapter 68 is the conventional cam and groove type, and matingly fits into the female coupler 74 fastened to the hose 64 as is known in the art. Conventional locking cams, not shown, carried by the female coupler connect the male adapter 68.

While the rotatable, swivel drop elbow of FIGS. 1–4 are to replace existing fixed drop elbows common in the industry, the swivel adapter-coupler of FIGS. 6–9 are designed to be employed with fixed drop elbows, converting the fixed drop elbow into a rotatable swivel drop elbow.

As shown in FIGS. 6–8, the swivel adapter-coupler is generally shown by reference numeral 79. The swivel adapter-coupler 79 has a housing 80 with a projecting portion 82 along the length of the housing 80. The housing has a bore 84 extending through the projecting portion 82.

A latch bar 86 has a lower portion 88, which is positioned within bore 84 and reciprocates vertically, from the perspective shown in FIG. 8, for example. The latch bar 86 also has an upper portion 90 that is offset with respect to the lower portion 88 for ease of access to the latch bar 86 during operation. Housing 80 is designed to be the female end and fit over the male fill pipe adapter known in the industry.

The housing 80 has an inner cylindrical bore 92 having an upper portion 94, and a lower portion 96, separated from one another by a ledge 98, as viewed from FIG. 8. The ledge 98 is merely an integral part of housing 80, created by boring the upper and lower portions 94, 96 of a larger diameter as compared to the bore of the ledge itself. The upper portion 94 houses a tube 100, which rotates with respect to the housing 80.

As shown in FIG. 6, tube 100 has an upper end 101 including an annular groove 103 on the exterior of the tube and is designed to be inserted, as a male-end, into the female end of a conventional fixed drop elbow. The tube 100 is pipe and is hollow on its inside 102, as shown in FIG. 8. This allows fluid or vapor to flow through the inside 102 to the lower bore 92 in housing 80. The tube 100 must be sealed with respect to the housing 80 so that no fluid leaks between these components. To seal these components, the outside lower surface of the tube 100 contains an annular groove 104 for holding a bearing strip 106. If desired, more than one sealing means may be employed to obtain a good seal between the housing 80 and the tube 100.

At the upper end of the tube 100 when viewing FIG. 8, is another annular groove 108 in the exterior surface thereof, near the upper end of the housing 80, which also contains a bearing strip 110 to aid in the rotation of the tube 100. Above bearing 110 is an annular recessed ledge 112 on the tube 100. A flat retaining C-ring 114 whose outer periphery snuggly fits within an annular groove 116 on the inside surface of the upper end of housing 80, extends substantially around the tube 100 and rests against the recessed ledge 112. The retaining C-ring 114 prevents the tube from disengaging from the housing (i.e. it can not move upwardly along its longitudinal axis) and ledge 112 prevents the elbow tube from moving downwardly, so that it can only rotate or swivel, with no axial movement.

Optionally, as shown in FIG. 8, a substantially frictionless bearing 118 may be positioned with an annular groove 120 in housing 80 so that it contacts and aids in the rotation of the tube 100. A dust seal 121 made of graphite-felt, for example, is positioned with groove 119, cut into the exterior surface of the lower portion of tube 100.

To secure the swivel adapter-coupler 79 to the fill pipe adapter 54 (see FIG. 5) of a UST 56, a quick connector is desirable. The quick connector apparatus of the swivel adapter includes the latch bar 86. The bottom of the latch bar 86 is mechanically affixed to a pair of locking cams 124, 126 as seen in FIGS. 6–9. The locking cams 124, 126 are conventionally known and retract to release the swivel adapter-coupler 79 from the fill pipe adapter 54 when the latch bar 86 is pulled upwardly. Otherwise the latch bar 86 and the locking cams 124, 126 are pushed down to lock onto the mating male adapter 54. The details of the locking cams are not disclosed herein since they are conventional.

A second embodiment of a swivel drop elbow is shown in FIGS. 10–13. The rotatable portion of the embodiment is accomplished by means of lubricated ball bearings, a means well known to those in the art. Also, a locking toggle lever is disclosed such that when locked down the drop elbow cannot be accidentally disconnected from the fill pipe adapter of the UST.

Figures 10, 11, 12:
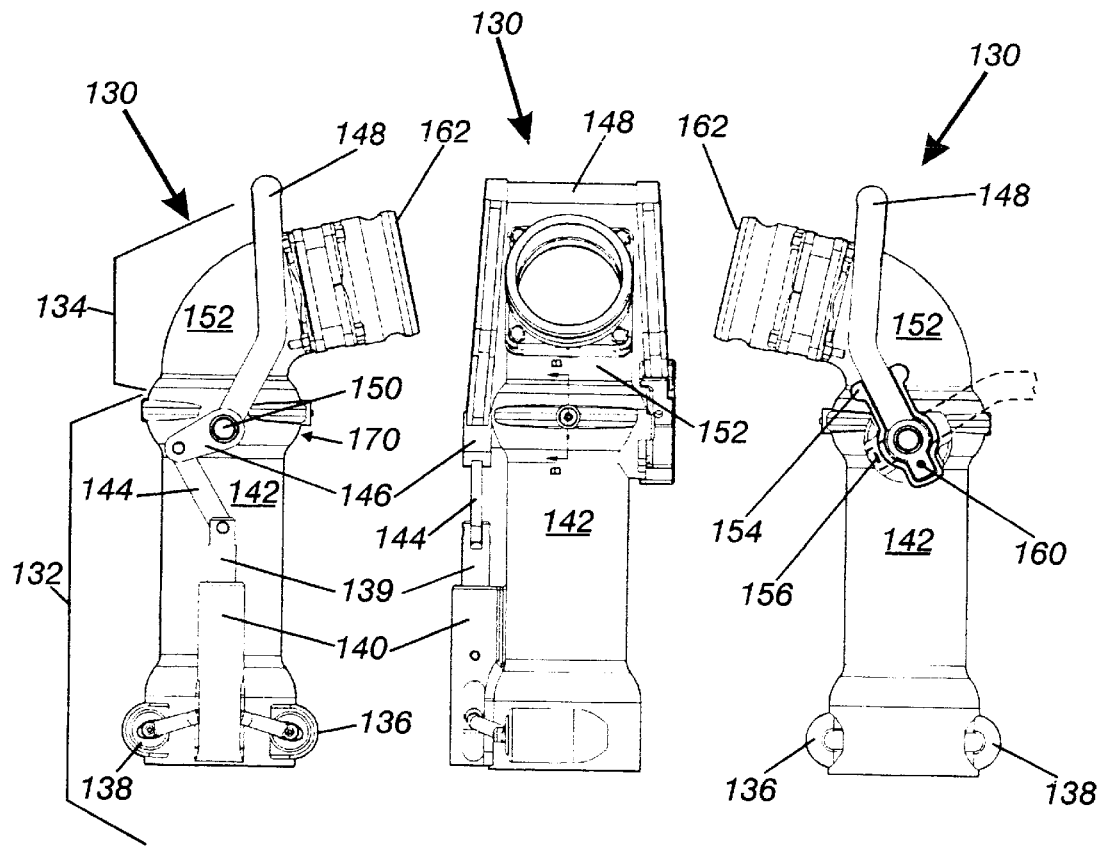
FIG. 10 is a side view of a second embodiment of the rotatable, swivel drop elbow of the present invention.
FIG. 11 is a front view of the second embodiment.
FIG. 12 is yet another side view of the second embodiment, except the entire drop elbow has been rotated 180 degrees compared to FIG. 10.

FIGS. 10–12 show various side views of a rotatable drop elbow 130 having a rotatable lower portion 132, and an upper swivel portion 134. The lower portion 132 is designed to couple securely with the fill pipe adapter 54. The lower portion is secured to the fill pipe adapter by means of a pair of locking cams 136, 138 like those shown in FIGS. 1–3, or FIG. 8. The locking cams are secured to a lower end of a reciprocating piston 139, held securely within a piston housing 140 that is firmly attached to hollow tube 142. The reciprocating piston 139 is pivotally secured at its upper end to an arm 144. Arm 144 is also pivotally secured at its upper end to a movable plate 146, which is fixably secured to toggle lever 148. The angle shown in FIG. 10, between the plate 146 and the toggle lever 148 is fixed (always the same). However, plate 146 and toggle lever 148 pivot with respect to the drop elbow housing 130 by means of a shaft 150.

FIGS. 10–12 show toggle lever 148 in the up (unlocked) position. As such it straddles the hollow elbow tube 152 and in this position the hollow elbow tube cannot rotate independently and distinctly from the hollow tube 142 because the hollow elbow tube projects and extends through the toggle lever 148, thereby limiting the rotational movement. Only when the toggle lever 148 is in the clamped-down position, as shown in dotted lines in FIG. 12, can the hollow elbow tube 152 pivot independently from hollow tube 142 and swing around and over toggle lever 148.

Only when the drop elbow 130 is secured to the UST, with the toggle lever 148 in the down (locked) position, can the kinks and loops in the hose running from a tanker truck be eliminated by rotating the hollow drop elbow 152 relative to hollow tube 142. To help the toggle lever 148 in either the up or down position, a lock tab 154 (shown in FIG. 12) has detents (only the down position detent 156 is shown because a similar up position detent is covered by toggle lever 148). The detents are engaged by a spring loaded roller ball 160 that secures the toggle lever 148 in either the up (release position) or down (secure position).

The lever lock tab 154 (FIG. 12) must be disengaged from its detent pocket before the toggle lever can be rotated downwardly to secure the drop elbow to the fill adaptor. Conversely the lever lock tab must be disengaged from its down lock detent pocket before the toggle lever can be rotated upwardly to disconnect from the fill adaptor. When locked in the up position the toggle is incapable of rotating because it comes into contact with the upper end 162. Therefore toggle lever 148 can be used to extract the hose from the tanker truck or used as a carrying handle when transporting the hose to the fill point. When the toggle lever is locked in the down position and secured to the fill pipe adaptor, the lock tab prevents the toggle lever from being accidentally raised thereby avoiding the possibility for a major fuel spill.

Figure 13:
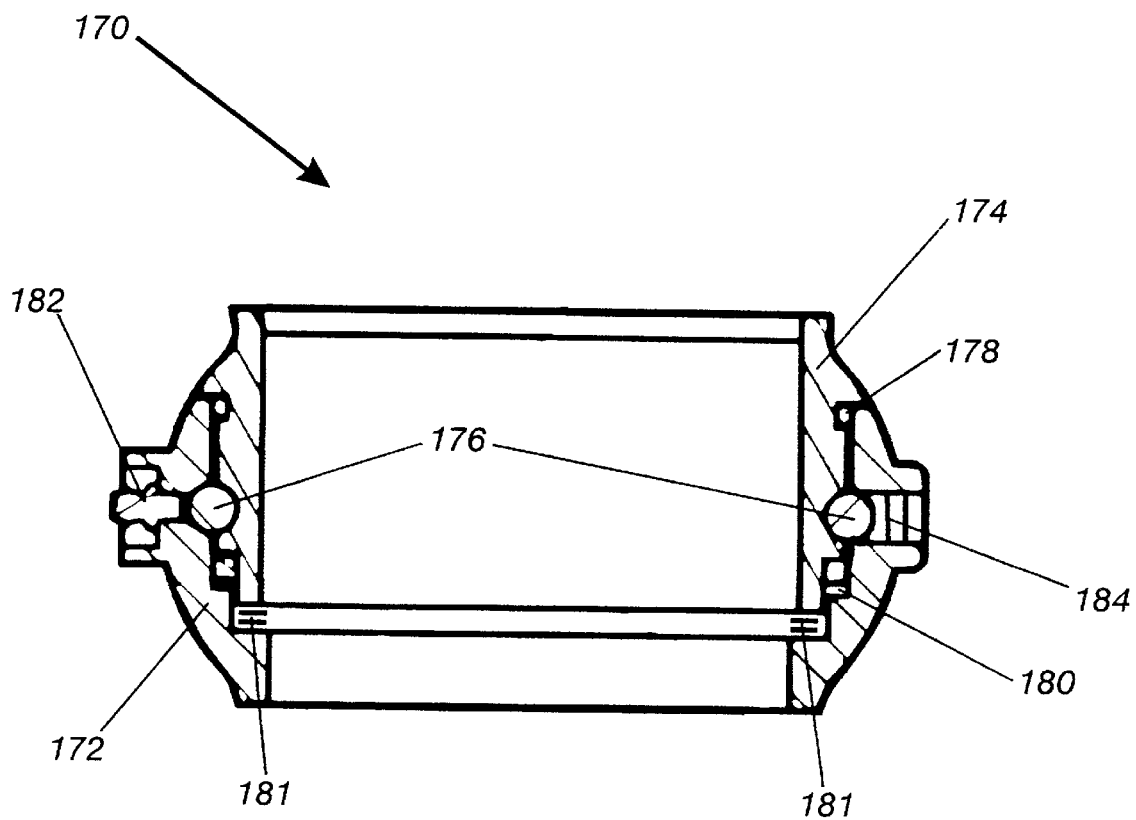
FIG. 13 is a cross-sectional side view along line B—B of FIG. 11, illustrating the details of the rotatable joint of the second embodiment.

FIG. 13 illustrates the swivel-rotatable mechanism 170 that permits the hollow drop elbow 152 to pivot relative to the hollow tube 142. The hollow tube 142 is secured to or an integral part of the outer ball race 172, while the drop elbow 152 is secured to (via welding, screw threads, glue, etc.) or an integral part of the inner ball race 174. Both the outer ball race 172 and inner ball race 174 are hollow and thereby fluidly communicate with hollow tube 142 and hollow drop elbow 152. A series of ball bearings 176 are equally spaced around and between the outer race 172 and inner race 174. A dust seal 178 and a liquid seal 180 are also annularly positioned between the inner and outer races to seal dust and water from the ball bearings 176, and to keep grease that lubricates the bearings 176 from contaminating the fluid flowing through the mechanism 170. The grease or lubricant is transferred to the bearings 176 via a grease fitting 182 as is conventionally known. The bearings 176 are held in position by means of a bearing retainer 184.

When fluid flows through a rubber hose, static charges develop and it is necessary to make certain that the swivel-rotatable mechanism 170 dissipates the charges to the grounded UST. Although the ball bearing 176 should convey the charge, it may not happen especially with grease surrounding the bearings. Therefore a coil spring 181 having just a few revolutions is employed to make certain the charge is transferred from outer race 172 to inner race 174, and to the UST when coupled thereto.

In operation, a hose from a tanker truck is secured to the hollow drop elbow 152 at its upper end 162, as similarly disclosed previously relative to FIGS. 1–3. The drop elbow 130 is connected to a UST by positioning the lower portion 132 over and in axial alignment with the fill pipe adapter, and rotating the toggle lever 148 from its upper position to its lower position. The rotation of the toggle lever 148 first causes plate 146 to push down on arm 144, which relaxes the spring loaded locking cams 136, 138 so that they flex enough to properly engage the fill pipe adapter, and then as the rotation continues, it allows the piston to return to its up position. As the toggle lever 148 is in the locked down position, shown in dotted lines in FIG. 12, the piston 139 has already returned to its spring loaded upper position and the pair of loaded cams are securely engaged with the fill pipe adapter. Once the toggle lever 148 is in the full lock down position, the hollow drop elbow 152 can rotate independently and distinctly from hollow tube 142 because the elbow 152 now is able to pass over toggle lever 148 and rotate in any direction. As fluid is permitted to flow through the hose to the UST, any kinks or loops in the hose can be eliminated by rotating the drop elbow 152. When the fluid drop operation is completed, a slight lifting of the toggle lever from its down position toward its up position, relaxes the locking cams and enables the operator to lift the drop elbow 130 from the drop pipe adapter. Once the lower portion 132 clears the drop pipe adapter, it can rotate in any direction necessary to permit the toggle lever 148 to fully return to its upper position.

Thus it is apparent that there has been provided, in accordance with the invention, both a swivel adapter-coupler and a rotatable drop elbow that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A rotatable drop elbow comprising:

a lower portion and an upper portion;

a swivel-rotatable mechanism positioned between said lower portion and said upper portion that permits said upper portion to rotate independently of said lower portion, and said lower portion includes a pair of locking cams adapted to securely lock on a pipe adapter of an UST, a toggle lever mechanically connected to said pair of locking cams, said toggle lever including a locking tab to secure said toggle lever in a release position or a secure position, wherein movement of said toggle lever releases/secures said drop elbow to a pipe adapter.

2. The rotatable drop elbow of claim 1, wherein said locking tab has a pair of detents to secure said toggle lever either in said release position or said secure position.

3. The rotatable drop elbow of claim 2, wherein said toggle lever is incapable of rotating in said release position.

4. A combination hose-and drop elbow for a fuel tanker truck, comprising:

a hose sufficiently flexible that it can twist, turn, and loop up on itself; and a drop elbow having a hollow lower portion and a hollow upper portion, one end of said hollow upper portion is secured to one end of said hose, one end of said hollow lower portion is adapted to be secured to the upper end of a stand pipe of an underground storage tank, a swivel-rotatable mechanism for rotatably securing together said hollow lower portion and said hollow upper portion for infinite rotation, thereby creating a fluid flow path from said hose through said drop elbow, locking means mounted on and near said one end of said hollow lower portion for lockingly engaging said upper end of a stand pipe, whereby said combination does not transfer torque from said hose to said stand pipe a toggle lever mechanically connected to said locking means, said toggle lever includes a locking tab to secure said toggle lever in a release position or secure position.

5. The combination of claim 4, wherein said locking means includes a pair of locking cams adapted to securely lock on said stand pipe of an UST.

6. The combination of claim 4, wherein said swivel-rotatable mechanism has an inner race and an outer race.

7. The combination of claim 6, wherein said swivel-rotatable mechanism has a series of ball bearings positioned between said inner race and said outer race.

8. The combination of claim 5, wherein said toggle lever is mechanically connected to said pair of locking cams wherein movement of said toggle lever releases/secures said drop elbow to said stand pipe.

* * * * *